United States Patent [19]

Delpretti

[11] Patent Number: 4,461,942
[45] Date of Patent: Jul. 24, 1984

[54] APPARATUS FOR ORIENTING THE WIRE ELECTRODE SUPPORT AND GUIDE MEMBER AND THE MACHINING FLUID NOZZLE OF A TRAVELLING WIRE EDM APPARATUS

[75] Inventor: Roger Delpretti, Vernier, Switzerland

[73] Assignee: Ateliers des Charmilles S.A., Geneva, Switzerland

[21] Appl. No.: 395,297

[22] Filed: Jul. 3, 1982

[51] Int. Cl.³ .............................................. B23P 1/08
[52] U.S. Cl. ................................. 219/69 W; 219/69 E
[58] Field of Search ..................... 219/69 W, 69 R, 68, 219/69 E, 69 M, 69 D

[56] References Cited

U.S. PATENT DOCUMENTS

| | | | |
|---|---|---|---|
| 4,353,785 | 10/1982 | Inoue | 219/69 W |
| 4,355,223 | 10/1982 | Inoue et al. | 219/69 W |
| 4,363,949 | 12/1982 | Pfau et al. | 219/69 W |

FOREIGN PATENT DOCUMENTS

| | | | |
|---|---|---|---|
| 2809506 | 9/1979 | Fed. Rep. of Germany | 219/69 W |
| 2942202 | 9/1980 | Fed. Rep. of Germany | 219/69 W |
| 54137 | 4/1980 | Japan | 219/69 W |
| 2042958 | 10/1980 | United Kingdom | 219/69 W |

Primary Examiner—M. H. Paschall
Attorney, Agent, or Firm—Hauke and Patalidis

[57] ABSTRACT

A unitary assembly supporting an electrode wire guide member and a machining fluid nozzle providing a jet of fluid coaxially disposed with the wire, in a travelling wire EDM apparatus. The unitary assembly is mounted on a plate connected through a universal swivel joint to the lower slide of a cross-slide table. Lateral displacements of the plate cause the unitary assembly to orient itself under the action of a pair of fingers mounted on the plate co-operating each with a ramp mounted on the cross-slide table such as the unitary assembly constantly remains coaxial with the electrode wire.

3 Claims, 4 Drawing Figures

APPARATUS FOR ORIENTING THE WIRE ELECTRODE SUPPORT AND GUIDE MEMBER AND THE MACHINING FLUID NOZZLE OF A TRAVELLING WIRE EDM APPARATUS

This application is related to application Ser. No. 395,299, contemporaneously filed herewith and assigned to the same assignee as the present application.

BACKGROUND OF THE INVENTION

The present invention relates to travelling wire EDM apparatus in general, and more particularly to a device for orienting the electrode wire support and guide member and the machining fluid injection nozzle of a travelling wire EDM apparatus.

It is known to provide travelling wire EDM apparatus with a device permitting to controllably orient the electrode wire support and guide member and to aim in an appropriate direction a nozzle injecting machining fluid in the machining zone between the electrode wire and the workpiece, the EDM apparatus comprising a support for the electrode wire guide member, a support for the workpiece, means for relatively displacing the electrode wire guide member support and the workpiece support such as to cut the workpiece according to a desired path, a cross-slide table supporting the electrode wire guide member relative to the guide member support, a pair of leadscrews each driven by a servo motor for controlling the displacement of the table cross-slides respectively in two directions transverse to the longitudinal axis of the wire, and means for orienting the guide member relative to the plane of the transverse displacements along the axis of the portion of the wire in the machining zone.

Such a device is disclosed for example in French Pat. No. 2,454,869. Such devices are generally relatively complicated and rely on electronic devices for determining the inclination of the guide member.

SUMMARY OF THE INVENTION

The present invention has for principal object to provide a unitary assembly, incorporating an electrode wire support member and a machining fluid nozzle, which is accurately oriented by entirely mechanical means as a function of the displacements of the cross-slide table supporting the unitary assembly, wherein the unitary assembly is supported from a plate through a universal joint swivelling relative to a stationary reference point, the plate being provided with two fingers each engaging an inclined stationary surface, the inclined surfaces being disposed such that any transverse displacement of the plate causes in turn an angular pivoting of the unitary assembly such as to maintain the axis of the unitary assembly aligned with the longitudinal axis of the electrode wire.

Further objects and advantages of the present invention will become apparent to those skilled in the art when the following description of an example of the best mode contemplated for practicing the invention is read in conjunction with the accompanying drawing wherein:

DETAILED DESCRIPTION OF THE PREFERRED EMBODIMENT

Figure 1:
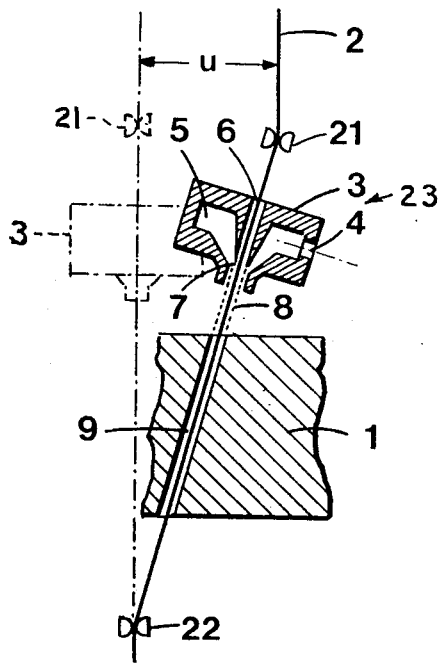
FIG. 1 is a schematic view useful in understanding the principle of the invention.

FIG. 1 of the drawing illustrates an electrode workpiece 1 in the process of being cut by means of an electrode wire 2 supported and guided by a pair of guide members 21 and 22, one disposed on one side and the other on the other side of the workpiece 1. The electrode wire 2 passes through a nozzle 3 such that the nozzle surrounds the wire. The nozzle 3 has a dielectric fluid inlet 4 leading into an annular chamber 5 surrounding a channel 6 through which passes the electrode wire 2. The dielectric fluid introduced into the annular chamber 5 flows through an annular outlet such as to form a jet 8 surrounding the wire and directed towards the machining zone 9 between the electrode wire 2 and the workpiece 1. The nozzle 3 and the wire guide member 21 form a unitary assembly, generally designated at 23, for guiding the wire 2 and injecting dielectric fluid in the machining zone 9. When the upper wire guide member 21 is in the position illustrated in phantom line, the nozzle 3 and the electrode wire 2 are also in the position represented in phantom lines. When the guide member 21 is displaced of a distance u from the position shown in phantom lines to the position shown in full lines, the nozzle 3 must be oriented in a direction corresponding to the inclination of the wire 2, such that the dielectric fluid jet 8 remains coaxial to the wire 2.

Figure 2:
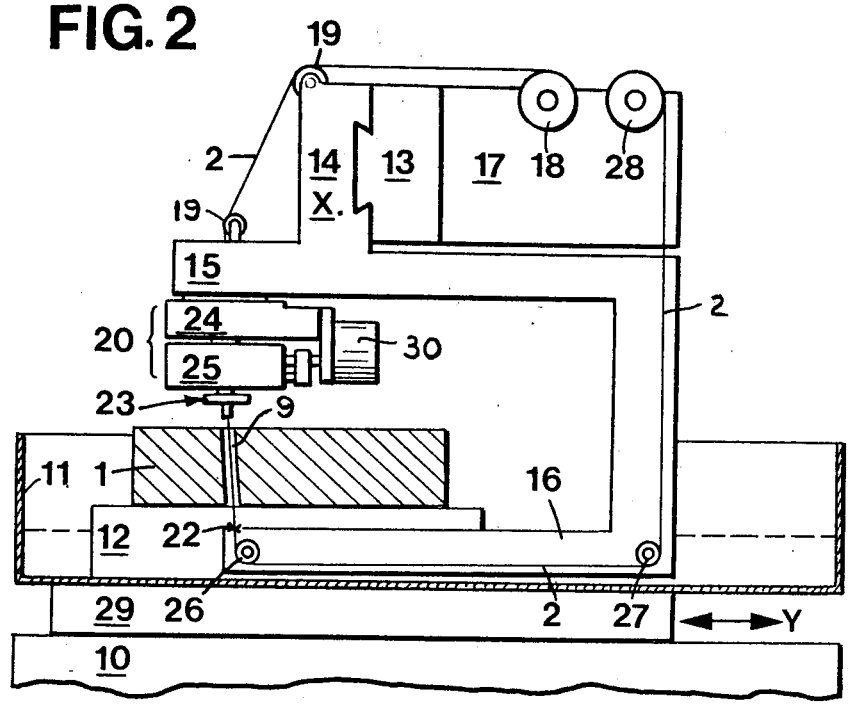
FIG. 2 is a side elevation view of a travelling wire EDM apparatus incorporating the invention.

As schematically illustrated at FIG. 2, a travelling wire EDM apparatus comprises a base 10 supporting a tank 11 in which the workpiece 1 is held by way of a workpiece support member 12. An overhead bridge member 13 is supported from the apparatus base 10, and the overhead bridge member 13 slidably supports a generally U-shaped electrode wire support member 14 provided with an upper arm 15 and a lower arm 16.

A support plate 17 carries a supply reel or spool 18 supplying the wire 2 forming the electrode tool for cutting the workpiece 1. The wire 2, after passing over the rollers 19, is fed through a support 20 carrying the fluid injection and wire guide member unitary assembly 23 which, as previously mentioned, comprise the nozzle 3 and the wire guide member 21 as schematically illustrated at FIG. 1. The support 20 is in the form of a cross-slide table having a pair of slides 24 and 25 each displaceable in a direction generally perpendicular to the direction of displacement of the other. The cross-slide table 20 permits to displace the assembly 23 relative to the support arm 15 for providing the wire 2, in the machining zone 9, with a desired inclination, for the purpose of effecting a cut in the workpiece 1 provided with walls disposed at an angle.

After passage through the lower wire guide member 22, the wire 2 is fed over a pair of rollers 26 and 27 and winds itself over a receiving spool 28 also supported by the support plate 17. As is well known in the art, means are provided for displacing a table 29 supporting the tank 11 and the workpiece 1 along a Y-axis, and the wire support member 14 relative to the overhead bridge member 13 along an X-axis, perpendicular to the plane of the drawing. The combination of the relative displacements along the Y- and X-axes permits to achieve a cut of desired path through the workpiece 1.

Figure 3:
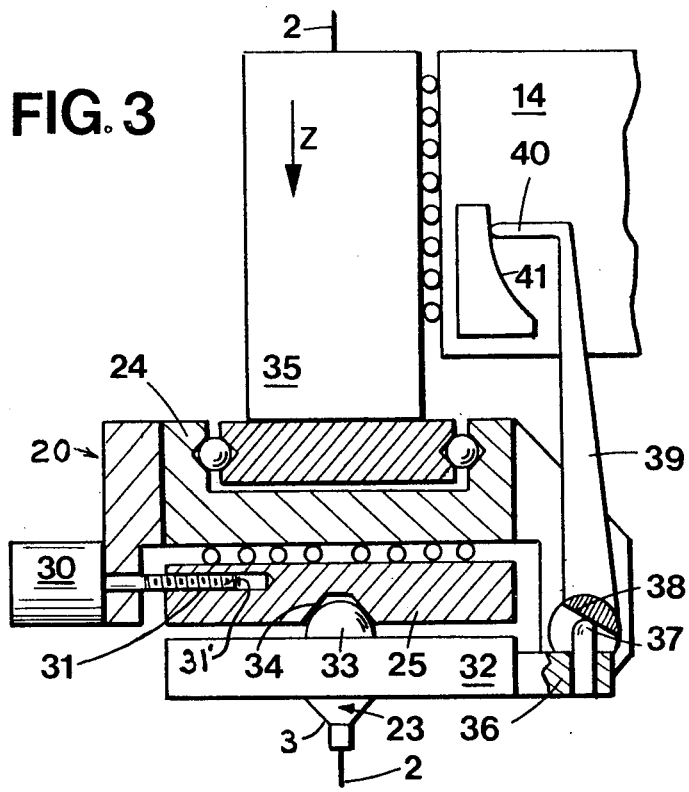
FIG. 3 is a section, at an enlarged scale, of a portion of the apparatus of FIG. 2.

FIG. 3 illustrates in section the means permitting to incline the unitary assembly 23 of the wire guide and fluid injection nozzle as a function of the relative displacement of the slides 24 and 25 of the cross-slide table 20. The displacement of the slide 25 relative to the slide 24 is effected by means of a servo motor 30, for example a stepping motor, which is attached to the slide 24 and whose output shaft is provided with a leadscrew 31 threading in a threaded bore 31' in the slide 25.

The unitary assembly 23 is supported by a plate 32 having a hemispherical portion 33 engaged in a frusto-conical bore 34 in the surface of the slide 25.

The plate 32 is urged towards the slide 25 by springs, not shown, such as to maintain the hemispherical portion 33 engaged in the frusto-conical bore 34. It will be appreciated that the illustrated cross-slide table 20 is mounted on the end of a holder 35 capable of vertical displacement along a Z-axis relative to the slide member 14. Such a vertical displacement permits to adjust the distance between the unitary assembly 23 and the lower wire guide member 22 as a function of the thickness of the workpiece 1. Such displacement is effected by means not shown but well known in the art. The plate 32 has a lateral extension 36 provided with a finger 37 which engages the surface of a ramp 38 pivotably mounted on the slide 24. The ramp 38 is integral with an arm 39 having a bent-over end portion 40 engaged with the surface of a cam 41 fixedly attached to the slide member 14.

In order to effectuate the displacement u referred to with respect to FIG. 1, the slide 25 is displaced either towards the left or the right of FIG. 3 by the servo motor 30. There results a corresponding displacement between the finger 37 and the ramp 38, which causes the plate 32 and the unitary assembly 23 to become inclined such that the unitary assembly of the wire guide member and fluid injection nozzle 3 remains substantially coaxial to the portion of the electrode wire 2 disposed within the machining zone 9, FIG. 2.

As is readily apparent from FIG. 2, the angle of inclination of the unitary assembly 23 is dependent upon the distance between the assembly and the lower wire guide member 22. When the distance decreases, as a result of a downward displacement of the holder 35, the arm 39 is displaced relative to the cam 41 and the slope of the ramp 38 increases, such that the inclination of the unitary assembly 23 varies in an increased ratio as a function of the displacement of the slide 25.

Figure 4:
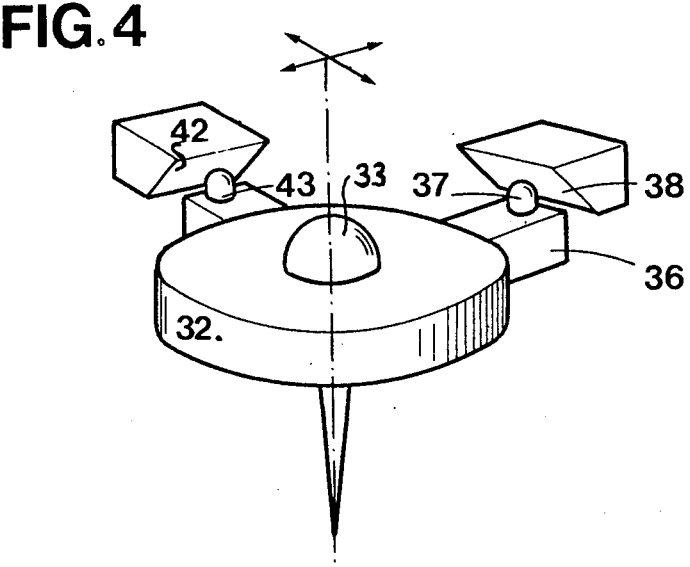
FIG. 4 is a schematic perspective view of the mechanism of FIG. 3, illustrating its operation.

As schematically illustrated at FIG. 4, the plate 32 co-operates with a second ramp 42 through a second finger 43, such as to compensate for the displacements of the slide 24 which take place in a direction perpendicular to the plane of the drawing. The ramp 42, which is not seen at FIG. 3, is supported by the holder 35 and is formed integral with an arm co-operating with a cam surface, such elements being identical to the arm 39 and the cam member 41 of FIG. 3.

In such manner, any displacement of the cross-slide table 20 produces an appropriate correction of the orientation of the unitary assembly 23 such that the machining fluid nozzle 3 is constantly aimed towards the lower wire guide member 22, FIG. 2, for maintaining the fluid jet 8, FIG. 1, constantly coaxial to the portion of the electrode wire 2 disposed in the machining zone 9.

In the structure illustrated, the lower wire guide member 22 is stationary, but it will be readily apparent to those skilled in the art that the lower wire guide member 22 can be replaced by an orientable wire guide and fluid nozzle unitary assembly, the machining fluid being consequently injected into the machining zone from both ends of the machining zone. In such arrangement, the orientable wire guide and fluid injection nozzle unitary assembly disposed below the workpiece 1 is interconnected with the upper wire guide and injection nozzle unitary assembly by mechanical or electrical means such as to control the inclination of the lower unitary assembly symmetrically to the inclination of the upper unitary assembly.

Having thus described the present invention by way of an example of structure well designed to achieve the objects of the invention, modifications whereof will be apparent to those skilled in the art, what is claimed as new is as follows:

1. In a travelling wire EDM apparatus wherein a workpiece is cut by electrical discharges between an electrode wire and said workpiece, said apparatus comprising a pair of electrode wire guide members, support means for said workpiece and means for relatively displacing said electrode wire guide members and said workpiece support means such as to cut said workpiece according to a desired shape, and a mechanism for orienting at least one unitary assembly comprising one of said electrode wire guide members and a nozzle for injecting machining fluid in a machining zone between said electrode wire and said workpiece, said mechanism comprising support means for said unitary assembly, said unitary assembly support means being controllably displaceable in directions transverse to the longitudinal axis of said electrode wire for inclining said electrode wire relative to said workpiece, a universal joint member attaching said unitary assembly to said unitary assembly support means, and a pair of fingers mounted on said unitary assembly, said fingers having each an end portion engaged on a ramp surface attached to a stationary portion of the EDM apparatus, each said ramp surface being oriented such that transverse displacement of said unitary assembly support means causes an angular displacement of said unitary assembly, whereby said unitary assembly is constantly oriented automatically along the longitudinal axis of said wire in the machining zone.

2. The mechanism of claim 1 further comprising means for adjusting the distance between said unitary assembly and the other of said electrode wire guide members, and means for adjusting the inclination of each said ramp surface as a function of said distance.

3. The mechanism of claim 1 wherein said unitary assembly comprises said nozzle disposed concentric to said electrode wire and injecting a coaxial jet of machining fluid into the machining zone between said electrode wire and said workpiece.

* * * * *